R. L. WILCOX.
HOPPER MECHANISM.
APPLICATION FILED MAY 8, 1917.
1,311,256.
Patented July 29, 1919.
2 SHEETS—SHEET 1.
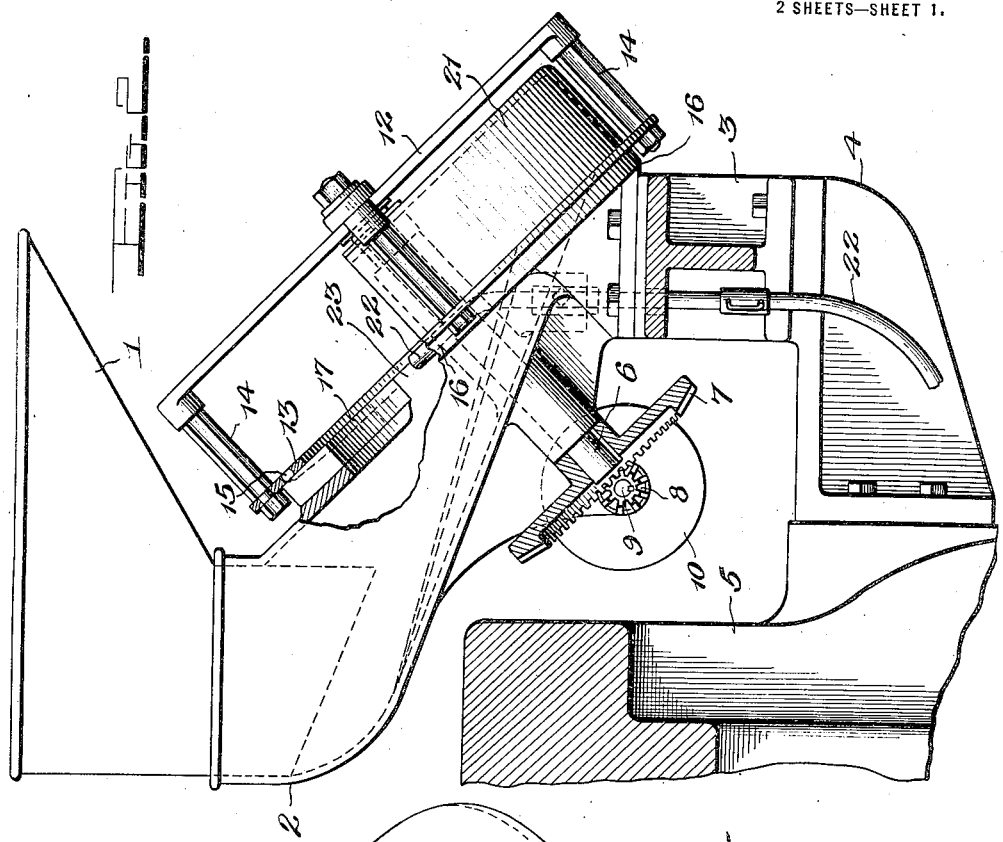
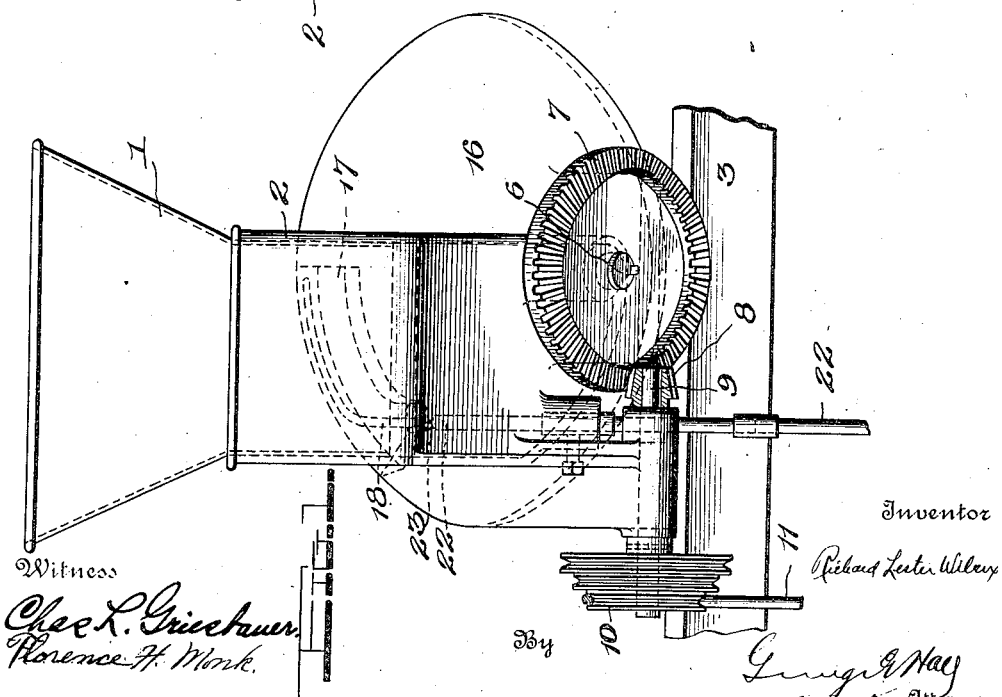
Witness
Chas. L. Grieshauer
Florence H. Monk.
Inventor
Richard Lester Wilcox
By George G. Hall
Attorney

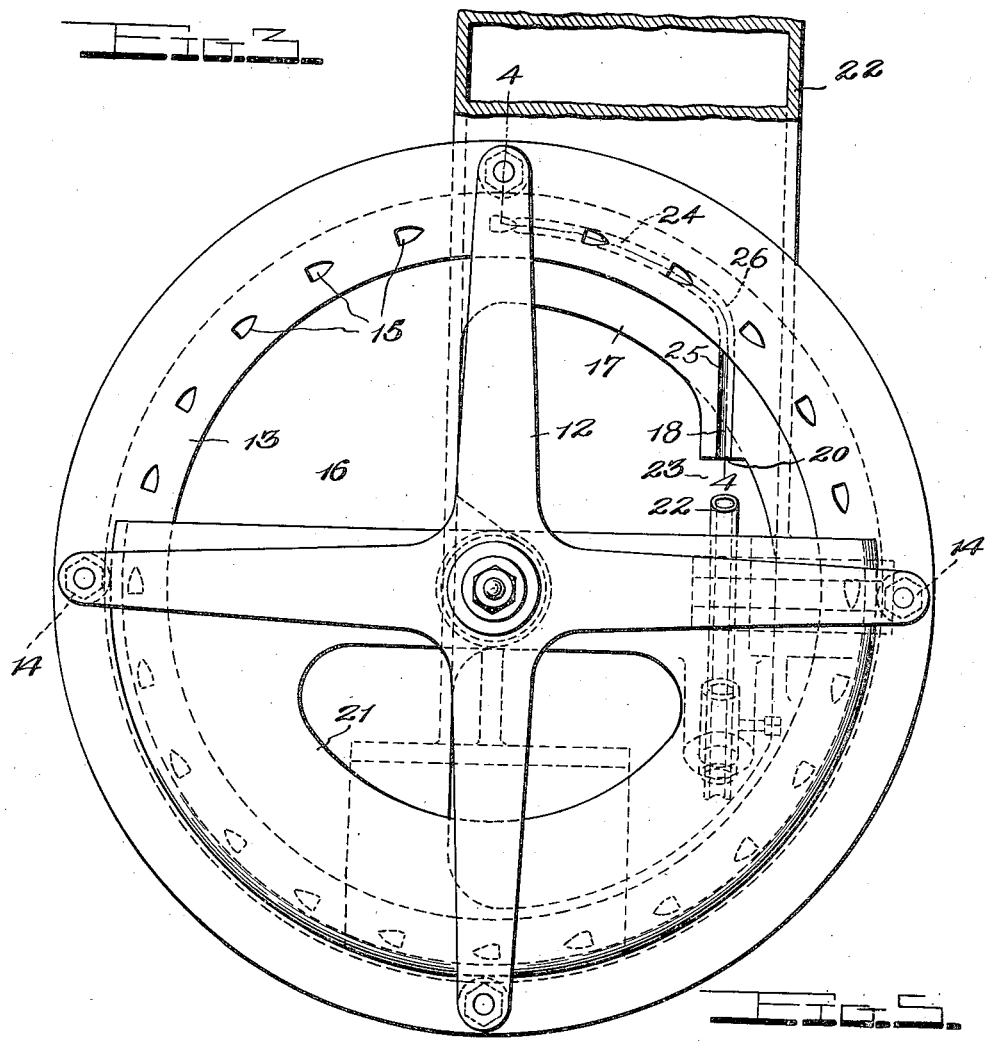

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

HOPPER MECHANISM.

1,311,256.  Specification of Letters Patent.  Patented July 29, 1919.

Original application filed May 9, 1916, Serial No. 96,368. Divided and this application filed May 8, 1917. Serial No. 167,243.

*To all whom it may concern:*

Be it known that I, RICHARD LESTER WILCOX, a citizen of the United States, residing at Waterbury, in the county of New Haven and State of Connecticut, have invented certain new and useful Improvements in Hopper Mechanism, of which the following is a specification, reference being had therein to the accompanying drawings.

My invention relates to a new and improved hopper mechanism, having particular reference to a device of this character that will receive articles of such shape that the center of gravity thereof is at substantially one end, and will deliver them into a receiving device successively with the so-called gravity end uppermost.

To these, and other ends my invention consists in the hopper mechanism, having certain details of construction and combinations of parts, as will be hereinafter described and more particularly pointed out in the claims.

Referring to the drawings, in which like numerals of reference designate like parts in the several figures;

Figure 1 is an elevation of my improved hopper mechanism;

Fig. 2 is a fragmentary elevation thereof showing the same attached to a machine part;

Fig. 3 is a plan view of a portion thereof;

Fig. 4 is an enlarged sectional view of the segment plate, taken upon line 4—4 of Fig. 3; and Fig. 5 is an enlarged view of one form of the article for which my improved hopper mechanism is adapted.

This hopper mechanism is shown as equipped to operate upon articles conical in form, although not limited to articles of such shape.

In the practice of my invention I provide a top member 1 which is preferably flaring upon its sides for the purpose of more readily leading the articles into the chute member 2 connected therewith, and supported at its lower end upon a bar 3 that is secured in one type of machine upon a bracket 4 fixed to a machine part 5. This method of attaching my hopper mechanism to a machine is only one of the many forms that can be used for this purpose, and constitutes no part of the present invention.

Journaled in the chute member is the shaft 6, having a beveled gear 7 thereon, which is driven from a beveled pinion 8 fixed on the shaft 9, mounted in the chute member 2, and rotated through a pulley 10, having a driving belt 11 connected therewith, as is usual.

Fixed to the outer end of the shaft 6 is a spider 12, to which is fixed the disk 13 by the rods 14. This disk is provided with a plurality of openings 15 therethrough of substantially the same shape, or slightly larger than the article to be delivered by the hopper mechanism.

In Fig. 5 one form of such article is illustrated and the openings 15 are shaped for such article. During the rotation of the disk it contacts with the upper face of the cylindrical portion or circular plate 16 of the chute member 2, and forming part thereof is a segmental discharge block 17, in which is a groove 18 of substantially the same width as the greatest diameter of the article to be fed, and having a curved portion 24 with substantially the same radius as the openings 15, and a substantially straight portion 25 at an angle to said curved portion, joined by the rounded corner 26. This groove varies in depth from the entrance end, designated by the numeral 19, to a depth at a point adjacent to the rounded corner 26 where its depth is substantially the same as the largest diameter of said article.

A semi-circular shield 21 is securely mounted upon the end of the hub or boss projecting from cylindrical portion 16 of chute member 2 and rests upon the disk 13 so as to form a pocket, in which the articles assemble as they are delivered from the chute member 2 out of the top member 1.

As the openings 15 in the disk 13 pass under the mass of articles lying within the shield 21, they are successively filled by the articles dropping therein by gravity. These articles are then carried with said disk until the openings 15 sucessively register with the end 19 of the groove 18, forming a segmental discharge conductor, in the segmental discharge block 17, at which time they begin to drop by gravity from the disk 13 into this groove, which gradually increases in depth, and thereby permits the said articles to pass entirely through the openings in said disk and lie entirely within said groove at about the corner 26 where the disk passes over said groove. By this mechanism the article is gradually and not instantly discharged from the disk, as the curved portion 24 of the groove 18 is in the same path as that of the openings 15, and as the depth of the groove at this time gradually increases, the article is pushed through this groove by the disk until near the curved corner 26 when the disk passes entirely over it and the article then travels by gravity through the straight portion 25 of said groove and escapes therefrom through the discharge end 20. The pressure of the disk 13 upon the end of the article, while it is dropping into the curved portion 24 of the groove, as well as the depth of said groove, prevents said article from changing its position end for end, as gravity would require, and as the corner portion 26 and the upper end of the straight portion 25 of the said groove are covered by the disk, the article is controlled in its first movement, free from the disk and has no opportunity to reverse itself. Irrespective of the speed of the disk, centrifugal force will not interfere with the continuous and free delivery of the articles to the groove 18. The articles, with their pointed ends down, drop into the upper end of a discharge or conductor tube 22 and are then conveyed to a delivery point.

There is an open space 23 between the face of the discharge block 17 and the upper end of the discharge or conductor tube 22, so that if the said tube is filled, the articles drop back into the hopper, to be taken therefrom as before described.

This overflow or spillway feature insures a continuous flow of articles, and at the same time prevents clogging of the parts, or the use of complicated mechanism to relieve the overflow, as has been common heretofore.

By this device a mass of articles are thrown indiscriminately into a hopper and a continuous flow of said articles is automatically delivered therefrom to a receiving or conductor mechanism with the heavier end uppermost, and any excess of articles over and above those that may be properly carried away by the receiving mechanism, drop back into the hopper mechanism, to be taken up again, as just described.

There are minor changes and alterations that can be made within my invention, and I would therefore have it understood that I do not limit myself to the exact construction herein shown and described, but claim all that falls fairly within the spirit and scope of the appended claims.

Having described my invention, what I claim as new, and desire to secure by Letters Patent, is—

1. In a hopper mechanism, the combination with a hopper; of a dial plate mounted thereon at an angle to the vertical, having a plurality of openings therein of substantially the same shape in cross section as that of the blanks to be operated upon; means for rotating said dial plate; and a plate connected with said hopper and having an angular groove therein of varying depth, one end of said groove being in juxtaposition with said dial plate and lying in a path of movement substantially tangential with relation to said openings.

2. In a hopper mechanism for sorting and delivering blanks of irregular shape, one end of which is heavier than the other, the combination with a hopper; of a chute connected therewith; a rotatably mounted shaft; a dial plate mounted on said shaft and rotatable in a plane at an angle to the vertical, said dial plate having a plurality of openings therethrough of substantially the same shape in cross section as said blanks; a shield connected with said chute, to prevent the escape of said blanks, resting loosely upon said dial; a segment plate held in a fixed position, having an angular groove therein, one end of which is in the path of the openings in said dial plate, and gradually increasing in depth; and a conductor tube fixed with its open end adjacent to one end of said said segment plate.

3. In a hopper mechanism, the combination with a hopper; of a dial plate having a series of pockets; means for rotating said dial plate; and a plate having an angular groove therein of varying depth, beginning at the inlet end juxtaposed tangentially relative to the path of movement of said pockets and gradually increasing to its maximum depth.

4. In a hopper mechanism, the combination with a hopper; of a dial plate mounted thereon, having a plurality of openings of substantially the same shape in cross section as that of the blanks to be operated upon; means for rotating said dial plate; a plate connected with said hopper and having a conducting groove or passage therein registering with said openings and the inlet end being juxtaposed substantially in a tangential position in relation to said openings; and a conductor tube fixed with one end opposite the outlet end of said groove or passage.

5. In a hopper mechanism for sorting and delivering blanks of irregular shape, one end of which is heavier than the other, the combination with a hopper; of a dial plate mounted thereon; means for rotating said dial plate; a shield fixed to said hopper adjacent to said dial plate; means for delivering blanks from said hopper onto the said dial plate in bulk; means connected with said dial plate, whereby said blanks are taken from said bulk, one at a time, and caused to travel with said dial in a path, with the lighter end thereof in front; a segment plate having an angular groove therein of varying depth, one end of which is in the path of movement of said blanks and into which said blanks drop by gravity, with their lighter end to the front; and a conductor tube fixed with its open end adjacent to the said segment plate and substantially opposite the deep end of said groove.

6. In combination with a hopper having a rotary member provided with a series of pockets therein; of means for conveying blanks therefrom, said conveying means comprising a conducting passage lying in the path of movement of said pockets and being so connected with said hopper as to leave an open space between it and the discharge point of said hopper.

7. In combination with a hopper having a rotating disk provided with a series of openings therein; of means for conveying blanks therefrom, said means comprising a groove or passage having its inlet end registering successively with said openings and being so arranged that when said conveying means is filled with blanks, any excess blanks delivered from said hopper will be returned thereto.

8. In combination with a hopper having associated therewith a rotary disk distributer with a series of pockets therein; a member adjacent to said distributer having a guide passage therein in the path of travel of said pockets, said member terminating at a point distant from the point where the blanks are discharged from said pockets; a conveyer tube for conducting blanks from said member and arranged in relation thereto so that there is a gap or open space therebetween, such gap or open space being in such relation to said member that any blanks not delivered from said member into said tube will drop into said hopper.

9. In a distributer of the class described; a moving element having a series of collecting pockets; and a stationary element having a conducting passage therein arranged relatively to said pockets so as to receive the contents thereof in transit without abruptly changing the direction of motion imparted thereto.

10. In a distributer of the class described; a moving element having a series of collecting pockets; a stationary element having a conducting passage therein increasing in depth toward the direction of travel of said moving element and arranged relatively to said pocket so as to gradually receive the contents of each pocket without abruptly changing the direction of motion imparted to said contents when in transit.

11. A hopper in combination with a distributer having a series of pockets arranged in a circle around said distributer and registering with the inlet end of a groove lying in the path of transit of said pockets; a conductor constituting a continuation of said groove; and a gap between the outlet end of said groove and the inlet end of said conductor.

12. In a mechanism of the class described; a rotating distributer having a series of openings therein; and a segmental discharge conductor concentric with the center of said distributer and successively registering with said openings.

13. In a mechanism of the class described; a rotary distributer having an inclined surface provided with a series of openings or pockets collecting objects in predetermined positions from a mass of objects in said distributer and successively delivering said objects to a discharge passage having an outlet located tangentially with relation to the path of movement of said openings or pockets.

14. In a mechanism of the class described; a rotatable disk having a series of openings therein; a stationary segmental passage lying in a plane below said disk registering with said openings and arranged to successively and gradually receive the articles, the transit of which through said groove being controlled by said disk substantially through the greater portion of said groove.

15. In a mechanism of the class described; a rotatable disk having a series of openings therein; a passage communicating with said openings, said passage having a segmental portion, a turning portion and a substantially straight portion, and arranged to successively and gradually receive articles from said openings, the transit of which articles in said passage being controlled by said disk through said segmental portion and turning portion.

In testimony whereof I have hereunto affixed my signature.

RICHARD LESTER WILCOX.